(12) United States Patent
Mechain et al.

(10) Patent No.: US 12,241,724 B2
(45) Date of Patent: Mar. 4, 2025

(54) OMNIDIRECTIONAL OPTRONIC SYSTEM HAVING TWO ROTATION AXES

(71) Applicant: THALES, Courbevoie (FR)

(72) Inventors: Grégoire Mechain, Elancourt (FR); Bertrand Forestier, Elancourt (FR); Bruno Bustin, Elancourt (FR); Pascal Rousseau, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 18/039,923

(22) PCT Filed: Nov. 30, 2021

(86) PCT No.: PCT/EP2021/083478
§ 371 (c)(1),
(2) Date: Jun. 1, 2023

(87) PCT Pub. No.: WO2022/117532
PCT Pub. Date: Jun. 9, 2022

(65) Prior Publication Data
US 2024/0060748 A1  Feb. 22, 2024

(30) Foreign Application Priority Data

Dec. 3, 2020  (FR) .................................... 2012572

(51) Int. Cl.
*F41G 7/22* (2006.01)
*G01S 7/495* (2006.01)

(52) U.S. Cl.
CPC ........... *F41G 7/224* (2013.01); *F41G 7/2213* (2013.01); *F41G 7/2246* (2013.01); *F41G 7/2293* (2013.01); *G01S 7/495* (2013.01)

(58) Field of Classification Search
None
See application file for complete search history.

(56) References Cited

U.S. PATENT DOCUMENTS

| 4,087,061 A | * | 5/1978 | Burt ...................... F41G 7/2293 359/557 |
| 6,779,753 B2 | | 8/2004 | Baumann et al. |
| 7,564,478 B2 | | 7/2009 | Baumann et al. |
| 8,334,490 B2 | | 12/2012 | Schaub et al. |

(Continued)

FOREIGN PATENT DOCUMENTS

| EP | 1308748 A1 * | 9/2002 | ........... F41G 7/2213 |
| EP | 2466246 A1 * | 12/2011 | ........... F41G 7/2293 |

(Continued)

OTHER PUBLICATIONS

F. Offi et al., "A Recovered Friend: the Afocal System"; "European Journal of Physics"; vol. 39; doi.org/10.1088/1361-6404/aa9d2f; published in the year 2018. (Year: 2018).*

*Primary Examiner* — Bernarr E Gregory
(74) *Attorney, Agent, or Firm* — BakerHostetler

(57) ABSTRACT

An omnidirectional optronic system includes two axes of rotation, a carrier axis and a carried axis, that are perpendicular to each other, for an aircraft targeting pod, having an imaging channel and a laser channel, the laser channel at the point of injection at the entrance of the system and the imaging channel being concentric with the carrier axis, then split and emitted out in parallel.

11 Claims, 3 Drawing Sheets

(56) References Cited

U.S. PATENT DOCUMENTS

| | | |
|---|---|---|
| 2003/0098387 A1 | 5/2003 | Baumann et al. |
| 2006/0243853 A1* | 11/2006 | Baumann ............... H04N 23/58 |
| | | 348/E5.03 |
| 2007/0075182 A1 | 4/2007 | Fetterly |
| 2010/0327105 A1* | 12/2010 | Eckhardt ............... F41G 7/2293 |
| | | 244/3.16 |
| 2011/0084195 A1 | 4/2011 | Schaub et al. |

FOREIGN PATENT DOCUMENTS

| | | | |
|---|---|---|---|
| EP | 1946350 B1 | 11/2013 | |
| WO | WO2013/167236 A1 * | 11/2013 | ........... F41G 7/2213 |

* cited by examiner

OMNIDIRECTIONAL OPTRONIC SYSTEM HAVING TWO ROTATION AXES

CROSS-REFERENCE TO RELATED APPLICATIONS

This application is a National Stage of International Patent Application PCT/EP2021/083478, filed on Nov. 30, 2021, which claims priority to foreign French Patent Application No. 2012572, filed on Dec. 3, 2020, the disclosures of which are incorporated by reference in their entirety.

FIELD OF THE INVENTION

The invention relates to an omnidirectional optronic system (or line-of-sight-orientating head) with two axes of rotation, comprising an imaging channel and a laser channel.

BACKGROUND

This optronic system is an apparatus that allows a combat platform to detect guided missiles equipped with an optical homing head fired in its direction, and that is capable of generating a laser beam and directing it toward the homing head of these missiles in order to neutralize them and divert them from their target.

Documents EP 1946350 B1, US 20070075182 A1, and U.S. Pat. No. 8,334,490 B2 disclose various embodiments of an omnidirectional optronic system with two axes of rotation, for a combat-aircraft targeting pod. As illustrated in FIG. 1, which is a figure of the two-axis line of sight comprises a laser emission pupil 1 that is off-center with respect to the carrier axis 2, and a reception pupil 3 that is centered on the carrier axis 2. These two pupils 1, 3 are spatially separate. The drawback of this solution is that the laser is transported to the carried axis 2 by means of an optical fiber, and therefore this transport introduces too much power loss at emitted wavelengths in the infrared. Documents US 20070075182 A1 and U.S. Pat. No. 8,334,490 B2 complete document EP 1946350 B1 by introducing an off-carrier-axis mirror to correct for aberrations introduced, by an external porthole taking the form of a spherical dome, into the laser channel, which is off-center.

Document U.S. Pat. No. 6,779,753 B2 is also known, this document disclosing an omnidirectional optronic system with two axes of rotation for a combat-aircraft targeting pod as illustrated in FIG. 2, which corresponds to FIG. 1 of document U.S. Pat. No. 6,779,753 B2. The two-axis optical line of sight comprises a laser emission pupil (the laser is designated by the reference number 66) that is off-center with respect to the carrier axis 16 and a reception pupil 58 that is centered on the carrier axis 16. The reception-end imaging and laser assembly is presented as being fixed. This imposes substantial opto-mechanical complexity, especially in respect of the steering prism 86, which must remain fixed between the portion that rotates about the carrier axis (vertical axis passing through the center of the dome-shaped porthole 12) and the mechanism for steering the laser, these being made up of a set of prisms and mirrors 86, 72 and 74 (synchronous with the rotation of the carrier axis). This prism makes it impossible to make more than one complete rotation of 360° and complete reversal is required at the limit of the rotation range (running the risk of loss of maintenance of the line of sight on an object during reversal). In addition, this system requires two motors on the carrier axis; however, using two motors is complex and would substantially increase occupied space.

Prior-art systems are steered with a singular point to avoid, or in other words to prevent, when the targeted object lies on the carrier axis, ambiguity, and the requirement for an instantaneous 180° rotation of the carrier axis.

SUMMARY OF THE INVENTION

One aim of the invention is to mitigate the problems cited above, and especially to make it possible to improve compactness, and to limit occultation of the imaging channel by the laser channel.

According to one aspect of the invention, an omnidirectional optronic system with two axes of rotation, a carrier axis and a carried axis, that are perpendicular to each other, is provided, this omnidirectional optronic system comprising an imaging channel and a laser channel, the laser channel at the point of injection at the entrance of the system and the imaging channel being concentric with the carrier axis, and further comprising:

in the laser channel:
   a first reflective surface, arranged at the entrance of the system at the point of injection, said first reflective surface being configured to split the laser channel from the optical channel, by reflecting the injected laser beam so as to deviate it from the carrier axis of the system;
   a second reflective surface for deflecting the laser beam reflected by the first reflective surface toward the exit window, which takes the form of a spherical dome, offset from the optical channel;
   an expander configured to increase the diameter of the laser beam reflected by the second reflective surface and to reduce its divergence;
   a deflector configured to modify the angular direction of the laser beam inside a cone of apex angle comprised between 3° and 6°;
   a third reflective surface and a fourth reflective surface configured to direct the expanded laser beam toward the exit window, which takes the form of a spherical dome, parallel to the carrier axis; and
   a compensating device configured to compensate for aberrations in the exit window, which takes the form of a spherical dome; and
in the imaging channel:
   a first group of lenses and a second group of lenses arranged as an afocal Kepler device; and
   a fifth reflective surface, a sixth reflective surface, a seventh reflective surface, and an eighth reflective surface, arranged between the two groups of lenses;
   the first reflective surface, the second reflective surface, the expander, the deflector,
   the third reflective surface, the fifth reflective surface, the sixth reflective surface, and
   the seventh reflective surface forming a first assembly that rotates as one about the carrier axis; and
   the fourth reflective surface, the eighth reflective surface, the second group of lenses, and the compensator forming a second assembly that rotates as one about the carried axis.

Such a system makes it possible to completely isolate the two optical channels (imaging channel and laser channel) while effectively limiting the photometric disruption caused to the imaging channel by the laser channel (optimization of backscatter and of retro-reflection of the laser into the imaging channel).

Furthermore, having an injection axis that is common to the laser channel and to the tracking, imaging channel and that is located on the carrier axis of a two-axis line-of-sight-orienting head allows more than one complete rotation of 360° in a small space, and thus the presence of a singular point to be avoided.

According to one embodiment, the system comprises a first stage that is rotatable about the carrier axis, allowing the line of sight to be rotated about the carrier axis.

In one embodiment, the system comprises a second stage that is rotatable about the carried axis, allowing the line of sight to be rotated about the carried axis.

Thus, the line of sight may be oriented in an angular space larger than 2πsr.

According to one embodiment, the afocal Kepler device has a magnification comprised in the interval of values [−2; −0.5].

This afocal device allows the pupil to be transported through the axes of rotation to within the vicinity of the laser-/imaging-channel splitter located on the carrier axis. Thus, the imaging beams may be propagated without vignetting using components of minimized dimensions, and the volume of the line-of-sight-orienting device is optimized. Furthermore, placing the splitter in the vicinity of a pupillary plane makes it possible to minimize the disruption to the imaging channel thus caused by the splitter.

In one embodiment, the afocal Kepler device has a magnification of −1.

According to one embodiment, the expander comprises a divergent/convergent afocal device.

For example, the divergent/convergent afocal device comprises lenses (conventional Galilean afocal device) or mirrors (off-axis Cassegrain afocal device).

This type of device allows divergence to be decreased without an intermediate focal point, and therefore without the risk of breakdown.

In one embodiment, the deflector comprises a Risley prism, or a two-axis mirror, allowing the laser line of sight to be oriented in the instantaneous imaging field.

Thus, the deflector makes it possible to improve compensation of residual movement-related defects in the motorized line-of-sight-orienting device so as to ensure the quality with which the beam is pointed in a looped tracking mode using the returned laser seen by the imaging channel.

The deflector also makes it possible to harmonize the directions of the laser and imaging optical axes. Lastly, placing this device as close as possible to the exit makes it possible to minimize the dimensions of the output laser optical components and therefore of the line-of-sight-orienting device.

According to one embodiment, the compensator comprises at least one off-center spherical or aspherical dioptric component.

The compensator is an optical component allowing aberrations introduced by the off-centeredness of the laser pupil with respect to the dome to be corrected, this allowing the quality of the laser beam to be guaranteed.

According to another aspect of the invention, a platform equipped with a system as described above is also provided.

For example, the platform may be a combat aircraft, a transport aircraft, a military aircraft, a drone, a ship, a land vehicle or a boat.

BRIEF DESCRIPTION OF THE DRAWINGS

The invention will be better understood on studying a few embodiments described by way of entirely non-limiting examples and illustrated by the attached drawing in which:

FIG. 3 illustrates an omnidirectional optronic system, with two axes of rotation, a carrier axis 1 and a carried axis 2, that are perpendicular to each other.

DETAILED DESCRIPTION

Figure 1:
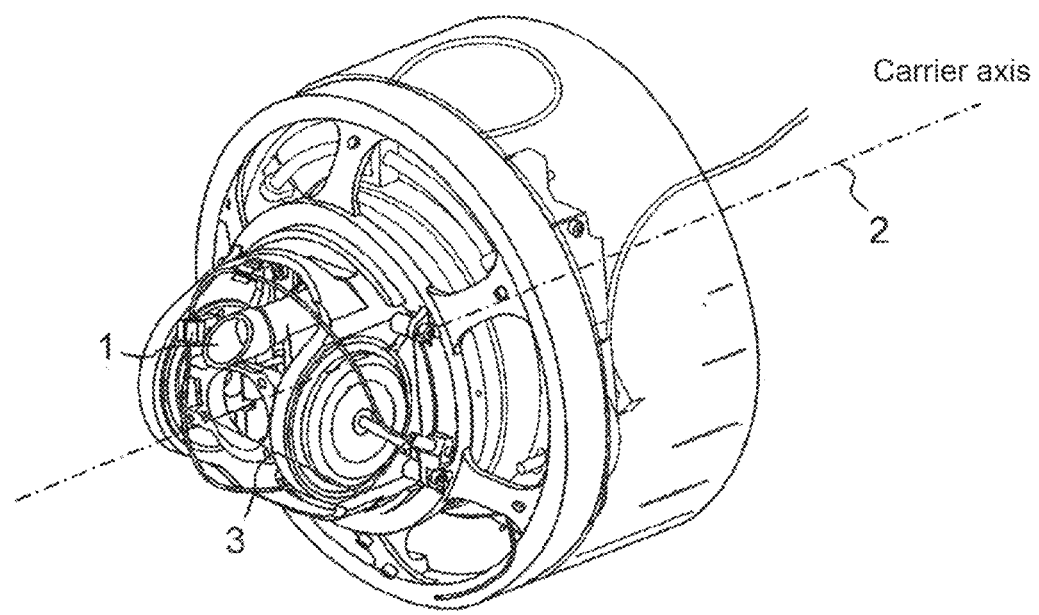
FIG. 1 schematically illustrates an omnidirectional optronic system, according to the prior art.
Figure 2:
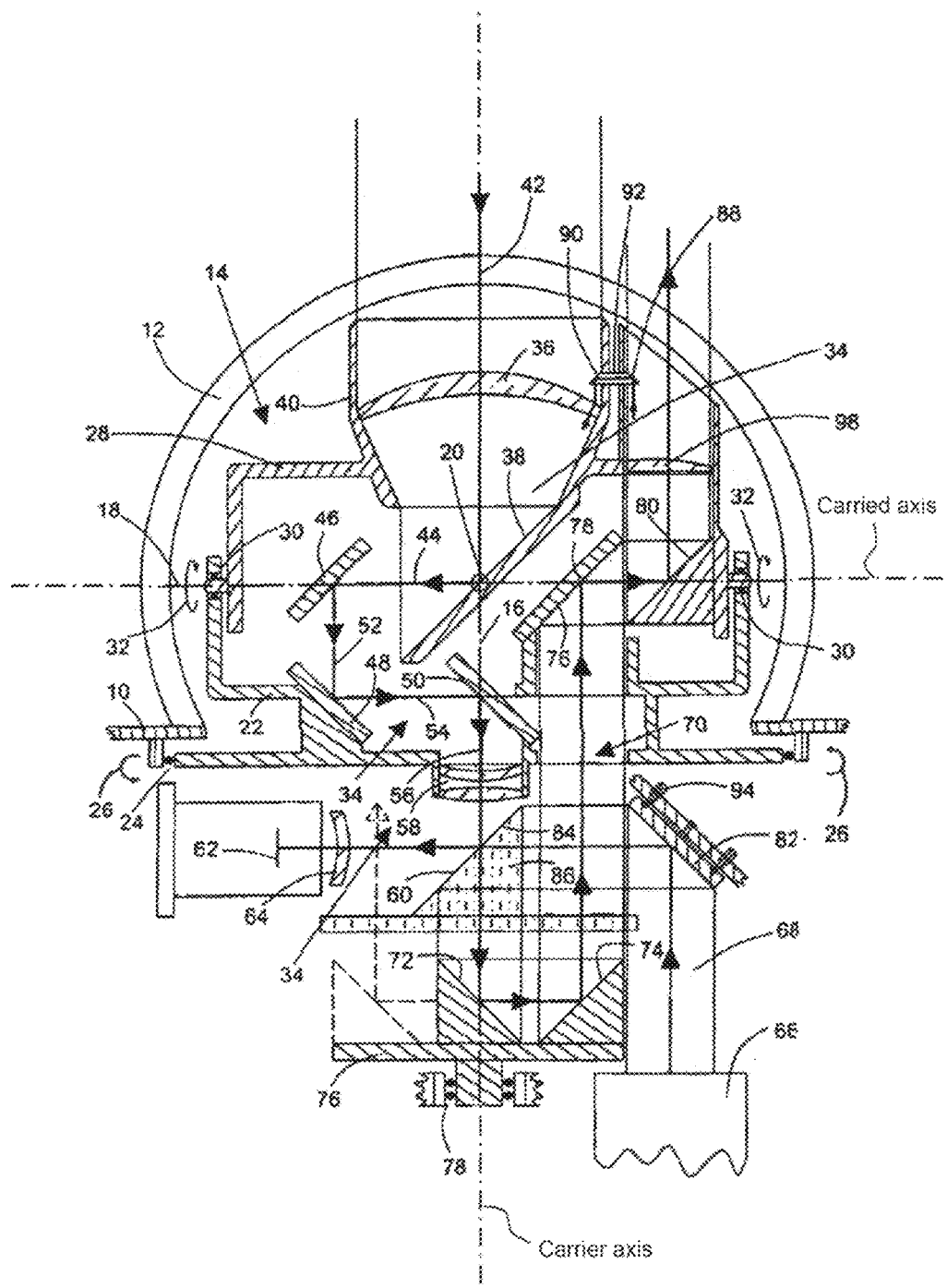
FIG. 2 schematically illustrates another omnidirectional optronic system, according to the prior art.
Figure 3:
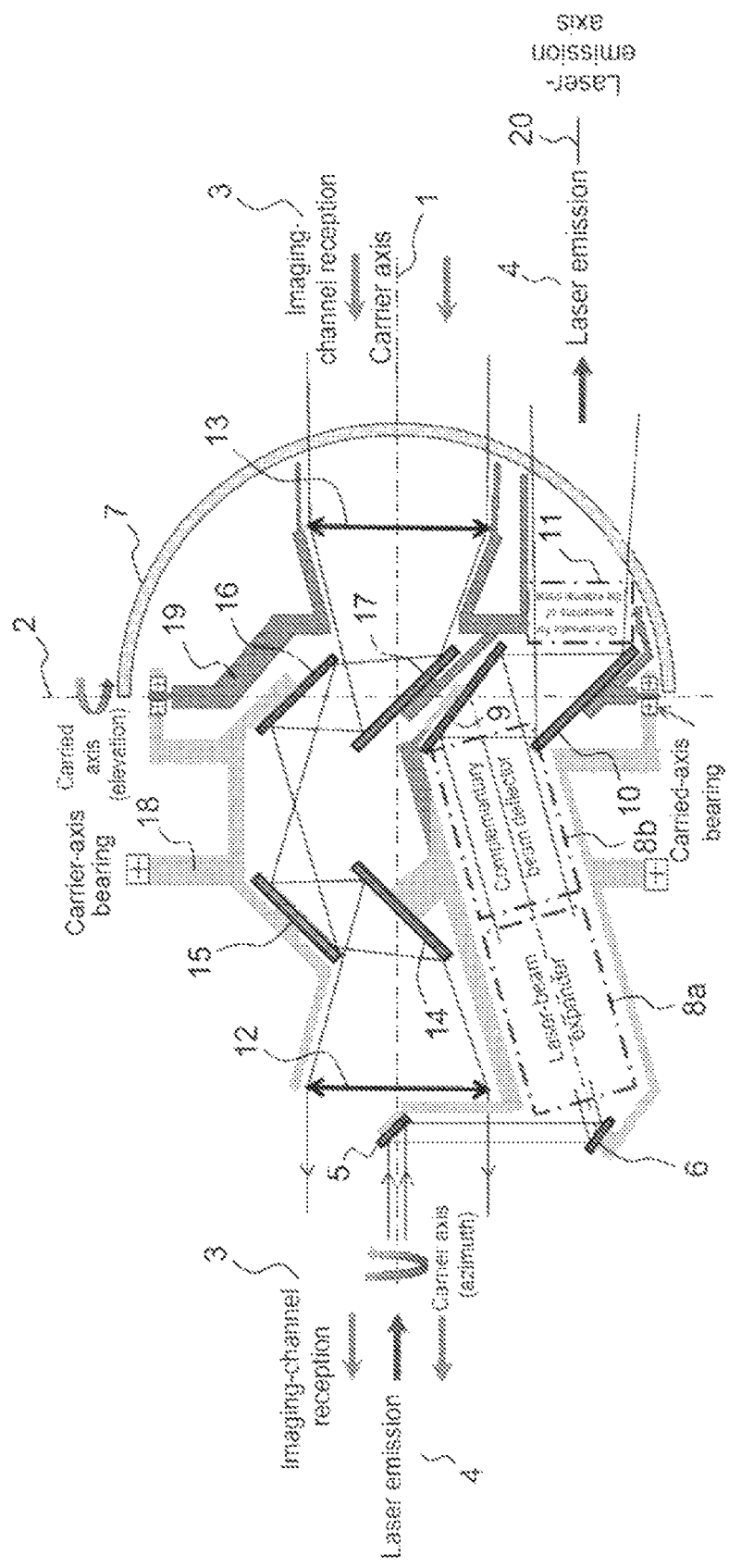
FIG. 3 schematically illustrates an omnidirectional optronic system, according to one aspect of the invention.

The system comprises an imaging channel 3 and a laser channel 4, wherein the laser channel 4 at the point of injection or emission at the entrance of the system and the imaging channel 3 are concentric with the carrier axis 1.

The laser channel 4 comprises:
a first reflective surface 5, arranged at the entrance of the system at the point of injection, said first reflective surface being configured to split the laser channel 4 from the imaging channel 3, by reflecting the injected laser beam so as to deviate it from the carrier axis 1 of the system;
a second reflective surface 6 for deflecting the laser beam reflected by the first reflective surface 5 toward the exit window 7, which takes the form of a spherical dome, offset from the imaging channel 3;
an expander 8a configured to increase the diameter of the laser beam reflected by the second reflective surface 6 and to reduce its divergence;
a deflector 8b configured to modify the angular direction of the laser beam inside a cone of apex angle comprised between 3° and 6°;
a third reflective surface 9 and a fourth reflective surface 10 configured to direct the expanded laser beam toward the exit window 7, which takes the form of a spherical dome, parallel to the carrier axis 1; and
a compensator 11 configured to compensate for aberrations in the exit window 7, which takes the form of a spherical dome.

The imaging channel 3 comprises:
a first group of lenses 12 and a second group of lenses 13 arranged as an afocal Kepler device; and
a fifth reflective surface 14, a sixth reflective surface 15, a seventh reflective surface 16, and an eighth reflective surface 17, arranged between the two groups of lenses 12, 13.

The imaging channel 3 and laser channel 4 are concentric with the carrier axis 1 at the point of injection on the latter.

They are split just after the point of injection of the laser beam 4, in order to obtain, as output from the system, two axes, the carrier axis 1 and the laser-emission axis 20, that are collinear but physically separate so as to prevent, on the one hand, parasitic coupling in the atmosphere between these channels, and on the other hand, the laser from passing through the intermediate focal plane of the afocal Kepler device of the imaging channel 3 and introducing, into this intermediate image, excessive power densities liable to disrupt both the imaging channel 3 and the beam quality of the laser channel 3.

The angular coverage of the optronic system is complete (>2π sr), the problem of the singular point being solved by means of the deflector 8b acting on the laser channel 4.

The first reflective surface 5, the second reflective surface 6, the expander 8a, the deflector 8b, the third reflective surface 9, the fifth reflective surface 14, the sixth reflective surface 15, and the seventh reflective surface 16 form a first assembly that rotates as one about the carrier axis 1.

The fourth reflective surface 10, the eighth reflective surface 17, the second group of lenses 13, and the compensator 11 form a second assembly that rotates as one about the carried axis 2.

The system also comprises a first holder 18 of the assembly that rotates as one about the carrier axis 1, said holder being equipped with carrier bearings allowing the rotation about the carrier axis 1.

The system comprises a second holder 19 of the assembly that rotates as one about the carried axis 2, said holder being equipped with carrier bearings allowing the rotation about the carried axis 2.

The Kepler afocal device 12, 13 has a magnification comprised in the interval of values [−2; −0.5], and for example of substantially −1.

The expander is an afocal device that is divergent/convergent in the direction of propagation of the laser. Such an afocal device may for example be produced using lenses (conventional Galilean afocal device) or mirrors (off-axis Cassegrain afocal device).

The deflector may comprise a Risley prism, or a two-axis mirror, allowing the laser line of sight to be moved in the instantaneous imaging field.

The compensator may comprise one or more off-center spherical or aspherical dioptric components.

A system according to the invention is mounted on a platform that may be a combat aircraft, a transport aircraft, a military aircraft, a drone, a ship, a land vehicle or a boat.

The invention claimed is:

1. An omnidirectional optronic system with two axes of rotation, a carrier axis and a carried axis, that are perpendicular to each other, comprising an imaging channel and a laser channel, the laser channel being at a point of injection at an entrance of the system and the imaging channel being concentric with the carrier axis, and further comprising:
   in the laser channel:
      a first reflective surface, arranged at the entrance of the system at the point of injection, said first reflective surface being configured to split the laser channel from the imaging channel, by reflecting a laser beam injected into the system so as to deviate said laser beam from the carrier axis of the system;
      a second reflective surface for deflecting the laser beam after being reflected by the first reflective surface toward an exit window, which takes the form of a spherical dome, offset from the imaging channel;
      an expander configured to increase a diameter of the laser beam after being reflected by the second reflective surface and to reduce its divergence;
      a deflector configured to modify an angular direction of the laser beam after being reflected by the second reflective surface and after passing through the expander inside a cone of apex angle comprised between 3° and 6°;
      a third reflective surface and a fourth reflective surface configured to direct the laser beam, after passing through the expander and the deflector, toward the exit window, which is formed as a spherical dome, parallel to the carrier axis; and
      a compensator configured to compensate for aberrations in the exit window, which is formed as a spherical dome; and
   in the imaging channel:
      a first group of lenses and a second group of lenses arranged as an afocal Kepler device; and
      a fifth reflective surface, a sixth reflective surface, a seventh reflective surface, and an eighth reflective surface, arranged between the two groups of lenses;
      the first reflective surface, the second reflective surface, the expander, the deflector, the third reflective surface, the fifth reflective surface, the sixth reflective surface, and the seventh reflective surface forming a first assembly that rotates as one about the carrier axis; and
      the fourth reflective surface, the eighth reflective surface, the second set of lenses, and the compensator forming a second assembly that rotates as one about the carried axis.

2. The system as claimed in claim 1, comprising a first stage that is rotatable about the carrier axis, allowing the line of sight to be rotated about the carrier axis.

3. The system as claimed in claim 1, comprising a second stage that is rotatable about the carried axis, allowing the line of sight to be rotated about the carried axis.

4. The system as claimed in claim 1, wherein the afocal Kepler device has a magnification comprised in the interval of values [−2; −0.5].

5. The system as claimed in claim 4, wherein the afocal Kepler device has a magnification of −1.

6. The system as claimed in claim 1, wherein the expander comprises a divergent/convergent afocal device.

7. The system as claimed in claim 6, wherein the divergent/convergent afocal device comprises lenses, or mirrors.

8. The system as claimed in claim 1, wherein the deflector comprises a Risley prism, or a two-axis mirror, allowing the laser line of sight to be oriented in the instantaneous imaging field.

9. The system as claimed claim 1, wherein the compensator comprises at least one off-center spherical or aspherical dioptric component.

10. A platform equipped with a system as claimed in claim 1.

11. The platform as claimed in claim 10, the platform being a combat aircraft, a transport aircraft, a military aircraft, or a drone, a ship, a land vehicle or a boat.

* * * * *